United States Patent
Tokui et al.

(10) Patent No.: US 8,738,223 B2
(45) Date of Patent: May 27, 2014

(54) ELECTRONIC CONTROL DEVICE

(75) Inventors: Nobumasa Tokui, Kobe (JP); Yoshiyuki Haji, Kobe (JP)

(73) Assignee: Fujitsu Ten Limited, Kobe-shi (JP)

(*) Notice: Subject to any disclaimer, the term of this patent is extended or adjusted under 35 U.S.C. 154(b) by 509 days.

(21) Appl. No.: 12/892,099

(22) Filed: Sep. 28, 2010

(65) Prior Publication Data
US 2011/0077820 A1 Mar. 31, 2011

(30) Foreign Application Priority Data

Sep. 30, 2009 (JP) ................................. 2009-228218

(51) Int. Cl.
G06F 7/00 (2006.01)

(52) U.S. Cl.
USPC ............... 701/36; 701/37; 701/45; 701/46; 701/47; 701/48; 73/493; 73/511

(58) Field of Classification Search
None
See application file for complete search history.

(56) References Cited

U.S. PATENT DOCUMENTS

| | | | | |
|---|---|---|---|---|
| 4,668,873 A * | 5/1987 | Ohba et al. | ................ | 307/9.1 |
| 5,986,575 A * | 11/1999 | Jones et al. | ................ | 340/906 |
| 6,082,197 A * | 7/2000 | Mizuno et al. | ............ | 73/514.36 |
| 6,195,261 B1 * | 2/2001 | Babutzka et al. | ............ | 361/752 |
| 6,252,520 B1 * | 6/2001 | Asami et al. | ................ | 340/903 |
| 6,429,789 B1 * | 8/2002 | Kiridena et al. | ............ | 340/905 |
| 6,559,761 B1 * | 5/2003 | Miller et al. | ................ | 340/435 |
| 6,796,177 B2 * | 9/2004 | Mori | ......................... | 73/504.02 |
| 6,906,619 B2 * | 6/2005 | Williams et al. | ........... | 340/425.5 |
| 6,933,837 B2 * | 8/2005 | Gunderson et al. | .......... | 340/436 |
| 7,146,856 B2 * | 12/2006 | Malametz | .................. | 73/514.32 |
| 7,325,454 B2 * | 2/2008 | Saito et al. | ..................... | 73/511 |
| 7,707,867 B2 * | 5/2010 | Babala et al. | ................. | 73/1.38 |
| 2002/0022927 A1 * | 2/2002 | Lemelson et al. | ............ | 701/301 |
| 2002/0171542 A1 * | 11/2002 | Bloomfield et al. | ......... | 340/464 |
| 2003/0180504 A1 * | 9/2003 | Yoshida et al. | ............... | 428/172 |
| 2003/0196490 A1 * | 10/2003 | Cardarelli | .................. | 73/504.02 |
| 2005/0285805 A1 * | 12/2005 | Ikeda et al. | ................... | 343/713 |
| 2006/0065050 A1 * | 3/2006 | Saito et al. | ...................... | 73/511 |

(Continued)

FOREIGN PATENT DOCUMENTS

JP   9297027   * 11/1997
JP   A-9-297027   11/1997

(Continued)

OTHER PUBLICATIONS

Nov. 29, 2012 Office Action issued in German Patent Application No. 10 2010 037 825.9 (with English Translation).

(Continued)

*Primary Examiner* — Khoi Tran
*Assistant Examiner* — Jonathan L Sample
(74) *Attorney, Agent, or Firm* — Oliff PLC

(57) ABSTRACT

An electronic control device is mounted in a vehicle and controls a control target provided in the vehicle. An acceleration sensor detects an acceleration of the vehicle. An angular velocity sensor detects an angular velocity of the vehicle. The acceleration sensor and the angular velocity sensor are mounted on an electronic substrate. A housing accommodates the electronic substrate and is fixed to a body of the vehicle. The electronic substrate is fixed to the housing at least four fixing points, and the acceleration sensor and the angular velocity sensor are arranged in the smallest target area from among a plurality of areas having multiple points selected from the at least four fixing points as vertexes.

11 Claims, 11 Drawing Sheets

(56) References Cited

U.S. PATENT DOCUMENTS

| | | | |
|---|---|---|---|
| 2007/0032951 A1* | 2/2007 | Tanenhaus et al. | 701/220 |
| 2007/0040365 A1* | 2/2007 | Asada | 280/735 |
| 2007/0150221 A1* | 6/2007 | Babala et al. | 702/85 |
| 2008/0053224 A1* | 3/2008 | Tsuji et al. | 73/504.12 |
| 2009/0013783 A1 | 1/2009 | Andersson et al. | |
| 2010/0133896 A1* | 6/2010 | Iyatani et al. | 303/20 |
| 2010/0281978 A1* | 11/2010 | Chang | 73/514.11 |
| 2011/0062775 A1* | 3/2011 | Iyatani | 303/20 |
| 2011/0077820 A1* | 3/2011 | Tokui et al. | 701/36 |

FOREIGN PATENT DOCUMENTS

| | | |
|---|---|---|
| JP | A-2005-283424 | 10/2005 |
| JP | A-2006-284336 | 10/2006 |
| JP | A-2009-029239 | 2/2009 |
| JP | A-2009-029240 | 2/2009 |

OTHER PUBLICATIONS

May 7, 2013 Notice of Rejection issued in Japanese Patent Application No. 2009-228218 (with partial English translation).

* cited by examiner

ELECTRONIC CONTROL DEVICE

The disclosure of Japanese Patent Application No. 2009-228218 filed on Sep. 30, 2009, including specification, drawings and claims is incorporated herein by reference in its entirety.

BACKGROUND

The present invention relates to an electronic control device which electronically controls a control target.

A technique for achieving safety during vehicle traveling has been developed with improvement of an electronic control technique.

For example, if occurrence of skidding is detected during corner traveling on the basis of an output value from an angular velocity sensor, an electronic control device controls the fuel injection amount of the engine or the ignition timing and performs brake control to cause the vehicle to appropriately travel along the corner, thereby preventing the vehicle from being out of the traveling line and causing an accident. This function is called VSC (Vehicle Stability Control).

If collision of the vehicle is detected on the basis of an output value from an acceleration sensor, an airbag electronic control device initiates a squib to cause the airbag to inflate, thereby preventing a passenger from being injured due to collision.

An electronic control device which is a core element for such control has an electronic substrate, on which electronic components, such as a microcomputer and sensors, are mounted, and the like. As a representative electronic component mounted on the electronic substrate, an angular velocity sensor or an acceleration sensor is provided. A sensor in which the associated components are shared and unified is disclosed in Patent Document 1.

An electronic control device having such sensors is designed such that the frequency band of a signal for detection by each sensor does not overlap the resonance frequency of the electronic control device having an electronic substrate and a housing. If the frequency band of a signal for detection by the sensor overlaps the resonance frequency of the electronic control device, the electronic control device may erroneously determine rotation or collision of the vehicle on the basis of a sensor detection signal when resonance occurs in the electronic control device.

Patent Document 1: JP-A-2005-283424

However, the frequency band of a signal for use when the acceleration sensor detects collision of the vehicle differs from the frequency band of a signal for use when a yaw rate sensor detects rotation of the vehicle. For this reason, even when the electronic control device is designed such that the resonance frequency does not affect the frequency band which is used in one sensor, if the resonance frequency overlaps the frequency band which is used in the other sensor, a control section erroneously controls a control target. Hereinafter, this problem will be described in detail.

As shown in FIG. 1, an airbag electronic control device mounted in a vehicle includes an electronic substrate 6 on which electronic components, such as an arithmetic section 2, an acceleration sensor 3 detecting the acceleration of the vehicle, a connector 4 for signal input/output with respect to an external device, and a capacitor 5 capable of supplying accumulated charges to the electronic components mounted on the electronic substrate, and a housing which accommodates the electronic substrate 6 and is fixed to the body of the vehicle.

The airbag electronic control device 1 has a function to determine whether the vehicle is colliding or not on the basis of the acceleration detected by the acceleration sensor 3, and when it is determined that the vehicle is colliding, to initiate the squib so as to cause the airbag to inflate.

The acceleration sensor 3 uses a low frequency band equal to or lower than thousands of Hz at the time of detection. In this case, if the resonance frequency which is generated when vibration is applied from the outside to the airbag electronic control device 1 having the housing and the electronic substrate 6 overlaps the low frequency band to be used, resonance occurs due to vibration, not collision of the vehicle, thus the control section of the airbag electronic control device 1 may erroneously determine that the vehicle is colliding and cause the airbag to inflate.

Resonance with a low frequency does not occur in a hard material. Thus, screws are fastened to four fixing portions of the housing and the electronic substrate to tightly fix the housing and the electronic substrate, such that the frequency of occurring resonance further increases and is kept out of the use frequency band of the sensor, thereby preventing erroneous control. Hereinafter, such fixing is called four-point fixing.

Meanwhile, as shown in FIG. 2, a VSC electronic control device mounted in the vehicle includes an electronic substrate 25 on which electronic components, such as an arithmetic section 21, an angular velocity sensor 22 detecting the angular velocity of the vehicle, a connector 23 for signal input/output with respect to an external device, and a capacitor 24 capable of supplying accumulated charges to the electronic components mounted on the electronic substrate 25, are mounted, and a housing which accommodates the electronic substrate 25 and is fixed to the body of the vehicle.

If occurrence of skidding is detected during corner traveling of the vehicle on the basis of an output value from the angular velocity sensor 22, the VSC electronic control device 20 has a function to control the fuel injection amount of the engine or the ignition timing and to perform brake control to cause the vehicle to travel along the corner, thereby preventing the vehicle from being out of the traveling line and causing an accident.

The angular velocity sensor 22 is, for example, a yaw rate G sensor. The angular velocity sensor 22 uses a yaw rate detection function to detect horizontal rotation of the vehicle and uses an acceleration detection function to detect skidding of the vehicle. Thus, traveling control is appropriately performed. The acceleration detection function of the yaw rate G sensor is inferior to the acceleration detection function of the acceleration sensor 3 mounted on the airbag electronic control device, and detects an acceleration (for example, 50) to an extent such that skidding of the vehicle can be detected.

In the angular velocity sensor 22, since a vibrating body provided in the angular velocity sensor 22 vibrates in accordance with an angular velocity which is a physical characteristic, the control section detects the angular velocity on the basis of the vibration characteristic. However, if the drive frequency (high frequency band of tens of thousands of Hz) overlaps the resonance frequency of the housing of the VSC electronic control device 20, and resonance occurs when the angular velocity is detected, a signal which is output from the angular velocity sensor 22 in accordance with the physical characteristic may be amplified, and the control section which receives the signal may perform erroneous control.

Resonance with a high frequency does not occur in a soft material. Thus, a buffer material, such as rubber, is provided between the housing and the electronic substrate 25, such that the resonance frequency to be generated is suppressed and kept out of the use frequency of the sensor, thereby preventing erroneous control.

The detailed configuration will be described with reference to FIG. 3. An upper housing part 40Xa and a lower housing part 40Xb of a housing 40X which accommodates the electronic substrate 25 and is fixed to the body of the vehicle are combined with each other so as to accommodate the electronic substrate 25. The combined members are fixed by fastening screws 49X to four fixing points 44X wrapped with a buffer material 50 for holding the electronic substrate 25. The electronic substrate 25 is indirectly fixed to the housing 40X through the buffer material 50.

Although the airbag electronic control device 1 has a function to cause the airbag to inflate at the time of collision, if the airbag electronic control device is broken, the function cannot be exhibited. For this reason, the airbag electronic control device is mounted near the center of the vehicle so as to be least subject to an external impact when the vehicle collides.

The VSC electronic control device 20 on which the angular velocity sensor 22 is mounted should be mounted near the center of the vehicle so as to accurately detect rotation of the vehicle. However, since a space near the center of the vehicle is small and the airbag electronic control device 1 is mounted, it is difficult to mount the VSC electronic control device 20. When one of the VSC electronic control device 20 and the airbag electronic control device 1 is selected and mounted near the center of the vehicle, from the preferential viewpoint of securing of the safety of the passenger of the vehicle, the airbag electronic control device 1 is selected.

Thus, a method is suggested in which the angular velocity sensor is mounted on the airbag electronic control device 1 so as to input a signal from the angular velocity sensor to the VSC electronic control device 20. With this configuration, it is possible to improve the accuracy of detection of rotation of the vehicle and to prevent the airbag electronic control device 1 from being broken at the time of vehicle collision.

FIG. 4 is a general view of an airbag electronic control device 30X on which an angular velocity sensor is mounted. As shown in FIG. 5, the airbag electronic control device 30X includes an electronic substrate 31X on which an angular velocity sensor 33X and an acceleration sensor 34X are mounted at the center of the electronic substrate 31X and other electronic components, such as an arithmetic section 32X, are appropriately mounted, and a housing which accommodates the electronic substrate 31X and is fixed to the body of the vehicle.

FIG. 6 is a perspective view showing a cross-section at a position P along an XY plane in the airbag electronic control device 30X of FIG. 4. FIG. 7 is a plan view showing the cross-section at the position P along the XY plane in the airbag electronic control device 30 of FIG. 4. A housing 40X has fixing portions 41X, 42X, and 43X which are fixed to the body of the vehicle by screws. The electronic substrate 31X has fixing points 44X, 45X, 46X, and 47X for fixing to the housing 40X.

A method of combining and fixing the housing 40X and the electronic substrate 31X is as shown in FIG. 8. That is, an upper housing part 40Xa and a lower housing part 40Xc are combined with each other so as to accommodate the electronic substrate 31X, such that fixing points 44Xb, 45Xb, 46Xb, and 47Xb of the electronic substrate 31X, fixing points 44Xa, 45Xa, 46Xa, and 47Xa of the upper housing part 40Xa, and fixing points 44Xc, 45Xc, 46Xc, and 47Xc of the lower housing part 40Xc are fixed by four screws 49X.

An example of how the resonance frequency of a first trial device in which the electronic substrate 31X and the housing 40X are fixed by four fixing points having the above-described buffer material and the resonance frequency of a second trial device in which the electronic substrate 31X and the housing 40X are fixed by four normal fixing points with no buffer material are generated will be described with reference to FIG. 9.

In FIG. 9, the horizontal axis represents a vibration frequency which is given to the first trial device or the second trial device, and the vertical axis represents a level (attenuation ratio (dB)) when the first trial device or the second trial device resonates in accordance with the given vibration frequency. Data representing the resonance level in each frequency band of the first trial device is data dt1 indicated by a one-dot-chain line, and data representing the resonance level in each frequency band of the second trial device is data dt2 indicated by a solid line.

Referring to FIG. 9, data dt1 of the first trial device indicates that, as indicated by an area A, the first trial device greatly resonates with the vibration frequency equal to or lower than thousands of Hz. When this happens, since the acceleration sensor 34X uses a low frequency band equal to or lower than thousands of Hz, if the first trial device resonates in the frequency band, the airbag may be erroneously controlled. Meanwhile, data dt1 indicates that resonance is small with the vibration frequency of tens of thousands of Hz. When this happens, since the angular velocity sensor 33X uses a high frequency band of tens of thousands of Hz, there is almost no case where vehicle control is erroneously performed. That is, it is certain that the first trial device is appropriate for exhibiting the VSC function based on the angular velocity sensor 33X without causing erroneous control.

Referring to FIG. 9, data dt2 of the second trial device indicates that, as indicated by an area B, the second trial device comparatively greatly resonates with the vibration frequency of tens of thousands of Hz. When this happens, since the angular velocity sensor 33X uses a high frequency band of tens of thousands of Hz, if the second trial device resonates in the frequency band, erroneous travel control may be performed by the VSC function. Meanwhile, data dt2 indicates that resonance is small with the vibration frequency equal to or lower than thousands of Hz. When this happens, since the acceleration sensor 34X uses a low frequency band equal to or lower than thousands of Hz, there is almost no case where the airbag is erroneously controlled. That is, it is certain that the second trial device is appropriate for exhibiting an airbag control function based on the acceleration sensor 34X without causing erroneous control.

However, the resonance frequency band of the airbag electronic control device on which both of the angular velocity sensor and the acceleration sensor are mounted should be set so as not to overlap all the frequency bands which are used by the sensors.

SUMMARY

It is therefore an object of at least one embodiment of the present invention to provide an electronic control device capable of preventing a control target from being erroneously controlled.

In order to achieve at least one of the above-described objects, according to a first aspect of the embodiments of the present invention, there is provided an electronic control device which is mounted in a vehicle and controls a control target provided in the vehicle, the electronic control device comprising: an acceleration sensor that detects an acceleration of the vehicle; an angular velocity sensor that detects an angular velocity of the vehicle; an electronic substrate on which the acceleration sensor and the angular velocity sensor are mounted; and a housing that accommodates the electronic substrate and is fixed to a body of the vehicle, wherein the electronic substrate is fixed to the housing at least four fixing points, and the acceleration sensor and the angular velocity sensor are arranged in the smallest target area from among a plurality of areas having multiple points selected from the at least four fixing points as vertexes.

With this configuration, the smallest target area from among a plurality of areas having multiple points selected from at least four fixing points as vertexes is most strongly fixed. For this reason, the amplitude of vibration in the target area can be reduced, and the frequency of resonance generated in the target area can be increased. Therefore, the angular velocity sensor and the acceleration sensor are arranged in the target area, such that it is possible to prevent the frequency band of a signal for use in each sensor and the resonance frequency from overlapping each other, and to prevent each sensor from outputting an erroneous signal.

The electronic substrate may have a substantially rectangular substrate surface, the at least four fixing points may be respectively arranged in the vicinity of four corners of the substrate surface and in the vicinity of a position out of a center of one side of the substrate surface, and the smallest area from among a plurality of triangular areas having three points selected from the at least four fixing points as vertexes may be set as the target area.

With this configuration, at least four fixing points are provided near the four corners of the substrate surface and near a position out of the center of one side of the substrate surface, such that the target area can be made small, and the target area can be strongly fixed. For this reason, the amplitude of vibration in the target area can be reduced, and the frequency of resonance generated in the target area can be increased. Therefore, the angular velocity sensor and the acceleration sensor are arranged in the target area, such that it is possible to prevent the frequency band of a signal for use in each sensor and the resonance frequency from overlapping each other, and to prevent each sensor from outputting an erroneous signal.

The housing may have fixing portions which are fixed to the body of the vehicle and arranged in the vicinity of three corners selected from four corners of a substantially rectangular opposing surface which is opposed to the body of the vehicle, and a pitch between the fixing portions in the vicinity of both ends of one side of the opposing surface may be smaller than a pitch between the fixing portions in the vicinity of both ends of another side of the opposing surface.

With this configuration, the housing is fixed to the vehicle body at the fixing portions provided near the three corners of the opposing surface, and the pitch between the fixing portions of one side is smaller than the pitch between the fixing portions of another side. For this reason, the fixing strength of one fixing portion to the vehicle body can be relatively weakened less than other two fixing portions. Therefore, when the vehicle collides, one fixing portion having weak fixing strength is intentionally broken, such that the electronic control device can be prevented from being broken as a whole.

The fixing portion provided at the position out of the center of one side of the substrate surface may be arranged in the vicinity of the one side of the opposing surface in the housing where the pitch between the fixing portions is small.

With this configuration, the fixing point is arranged near one side of the opposing surface where the pitch between the fixing portions having relatively strong fixing strength to the vehicle body is small. Therefore, the target area can be further strongly fixed, and the frequency of resonance generated in the target area can be increased.

The electronic control device may further comprise a capacitor which is capable of supplying accumulated charge to a component mounted on the electronic substrate, the capacitor may be arranged in the vicinity of one corner of the substrate surface other than the target area in the electronic substrate.

With this configuration, the capacitor which has a height greater than other electronic components and may amplify resonance of the electronic control device is mounted away from the sensors. Therefore, it is possible to prevent each sensor from outputting an erroneous signal.

The electronic control device may further comprise a connector that communicates a signal with an external device, the connector may be arranged along a side whose one end is an opposing corner of the substrate surface, at which the capacitor is arranged, in the electronic substrate.

With this configuration, the capacitor and the connector are mounted away from each other such that noise generated by the capacitor does not affect the input/output signal of the connector. Therefore, the control target can be accurately controlled.

The electronic substrate is directly fixed to the housing. Thus, it is possible to rigidly fix the electronic substrate to the housing.

The angular velocity sensor and the acceleration sensor may be arranged in the target area such that a resonance frequency at a mounting position of the angular velocity sensor is higher than the resonance frequency at a mounting position of the angular velocity sensor.

The housing may have fixing portions which are fixed to the body of the vehicle, and the angular velocity sensor may be arranged in an overlapped area where the target area and an area defined by the fixing portions overlap each other.

According to a second aspect of the embodiments of the present invention, there is provided an electronic control device which is mounted in a vehicle and controls a control target provided in the vehicle, the electronic control device comprising: an acceleration sensor that detects an acceleration of the vehicle; an angular velocity sensor that detects an angular velocity of the vehicle; an electronic substrate on which the acceleration sensor and the angular velocity sensor are mounted; and a housing that accommodates the electronic substrate and is fixed to a body of the vehicle, wherein the electronic substrate is fixed to the housing at a plurality of fixing points, and the plurality of fixing points include first fixing points which are respectively arranged in the vicinity of four corners of a substantially rectangular substrate surface of the electronic substrate and a second fixing point which is arranged close to one of the four first fixing points so as to sandwich the acceleration sensor and the angular velocity sensor.

With this configuration, a plurality of fixing points are provided so as to pinch two sensors, such that the area where the two sensors are arranged is strongly fixed. For this reason, the amplitude of vibration in the relevant area can be reduced, and the frequency of resonance generated in the relevant area can be increased. Therefore, it is possible to prevent the frequency band of a signal for use in each sensor and the resonance frequency from overlapping each other, and to prevent each sensor from outputting an erroneous signal.

According to a third aspect of the embodiments of the present invention, there is provided an electronic control device which is mounted in a vehicle and controls a control target provided in the vehicle, the electronic control device comprising: an acceleration sensor that detects an acceleration of the vehicle; an angular velocity sensor that detects an angular velocity of the vehicle; an electronic substrate on which the acceleration sensor and the angular velocity sensor are mounted; and a housing that accommodates the electronic substrate and is fixed to a body of the vehicle, wherein the electronic substrate is fixed to the housing at least four fixing points, and the acceleration sensor and the angular velocity sensor are arranged in a target area having the highest resonance frequency from among a plurality of areas having multiple points selected from the at least four fixing points as vertexes.

With this configuration, the acceleration sensor and the angular velocity sensor are provided in the area having the highest resonance frequency from a plurality of areas having multiple points selected from a plurality of fixing points as vertexes. Therefore, it is possible to prevent the frequency band of a signal for use in each sensor and the resonance frequency from overlapping each other, and to prevent each sensor from outputting an erroneous signal.

DETAILED DESCRIPTION OF THE EMBODIMENTS

Hereinafter, an embodiment of the invention will be described with reference to the accompanying drawings.

Figure 4:
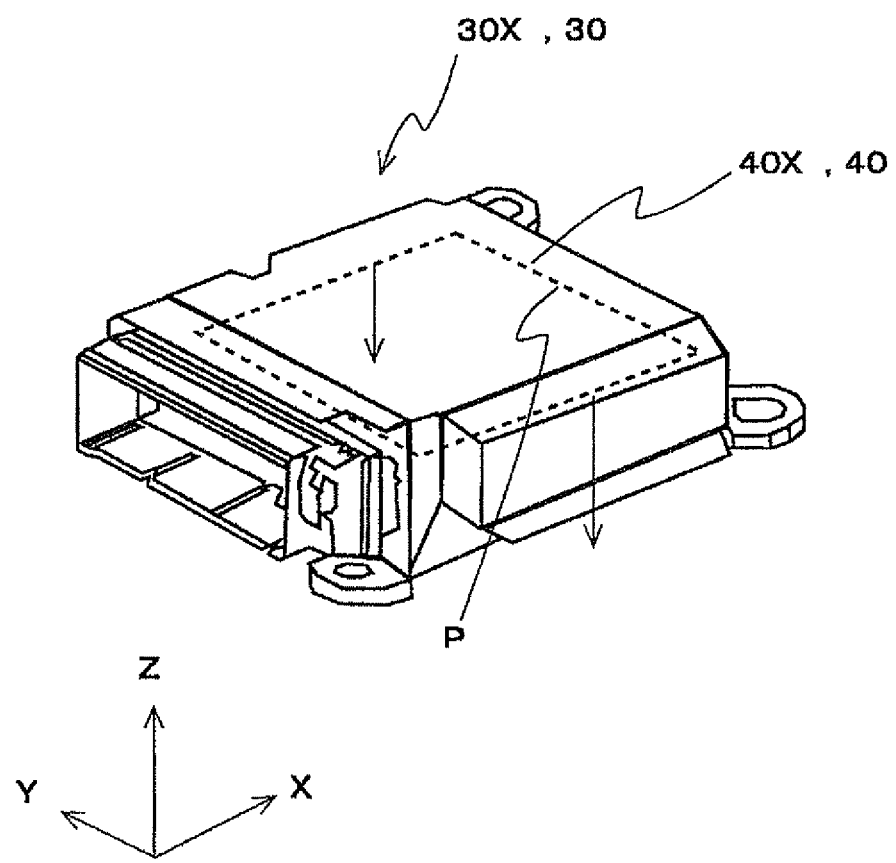
FIG. 4 is a diagram showing an electronic control device.
Figure 5:
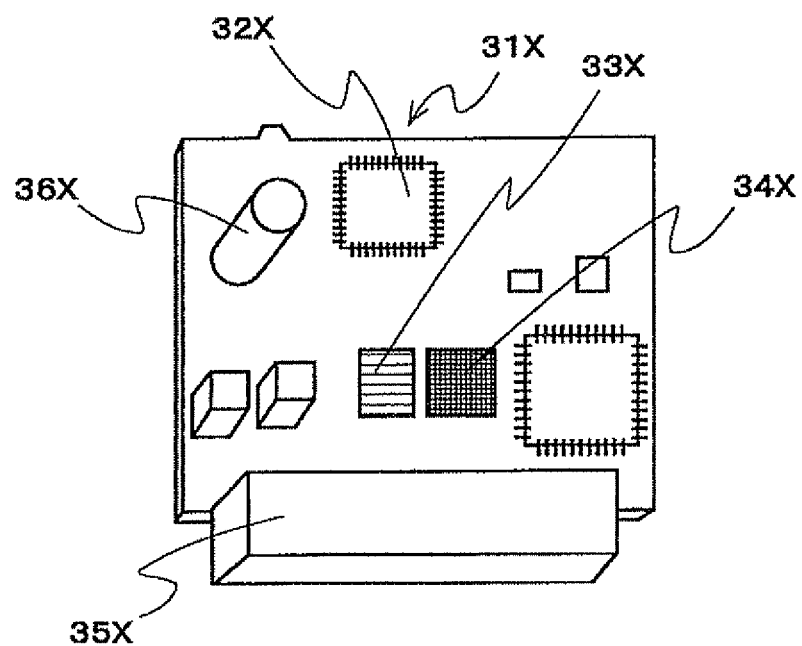
FIG. 5 is a diagram showing an electronic control device.
Figure 6:
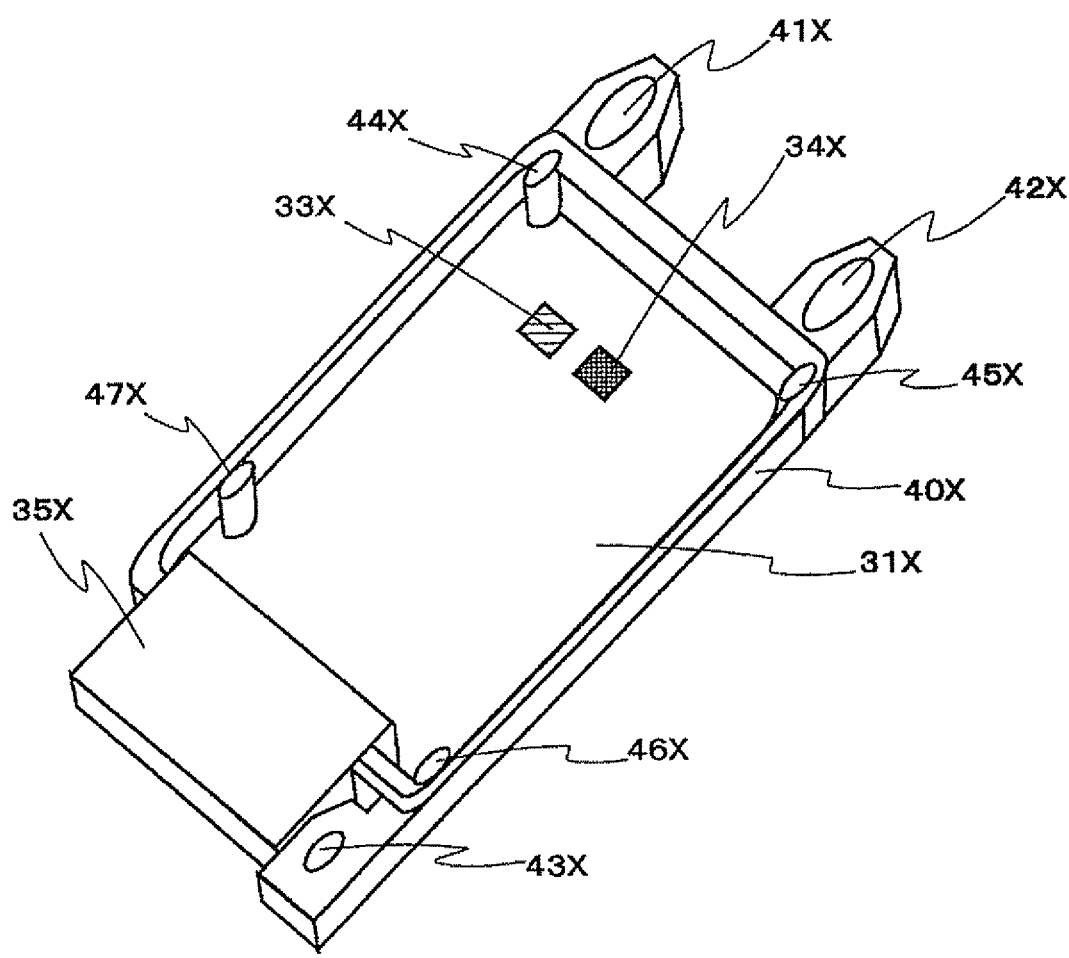
FIG. 6 is a diagram showing an electronic control device.
Figure 7:
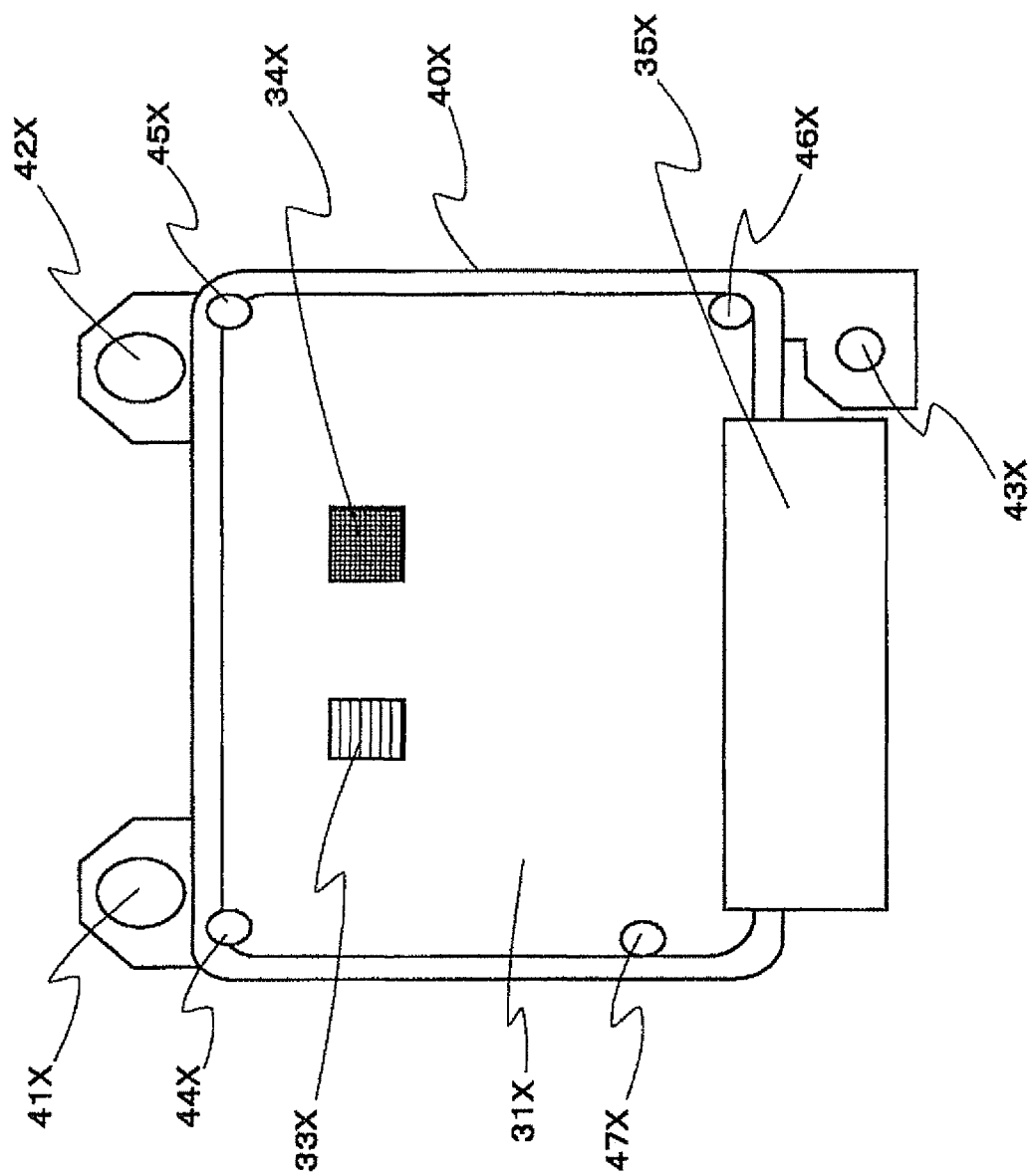
FIG. 7 is a diagram showing an electronic control device.
Figure 8:
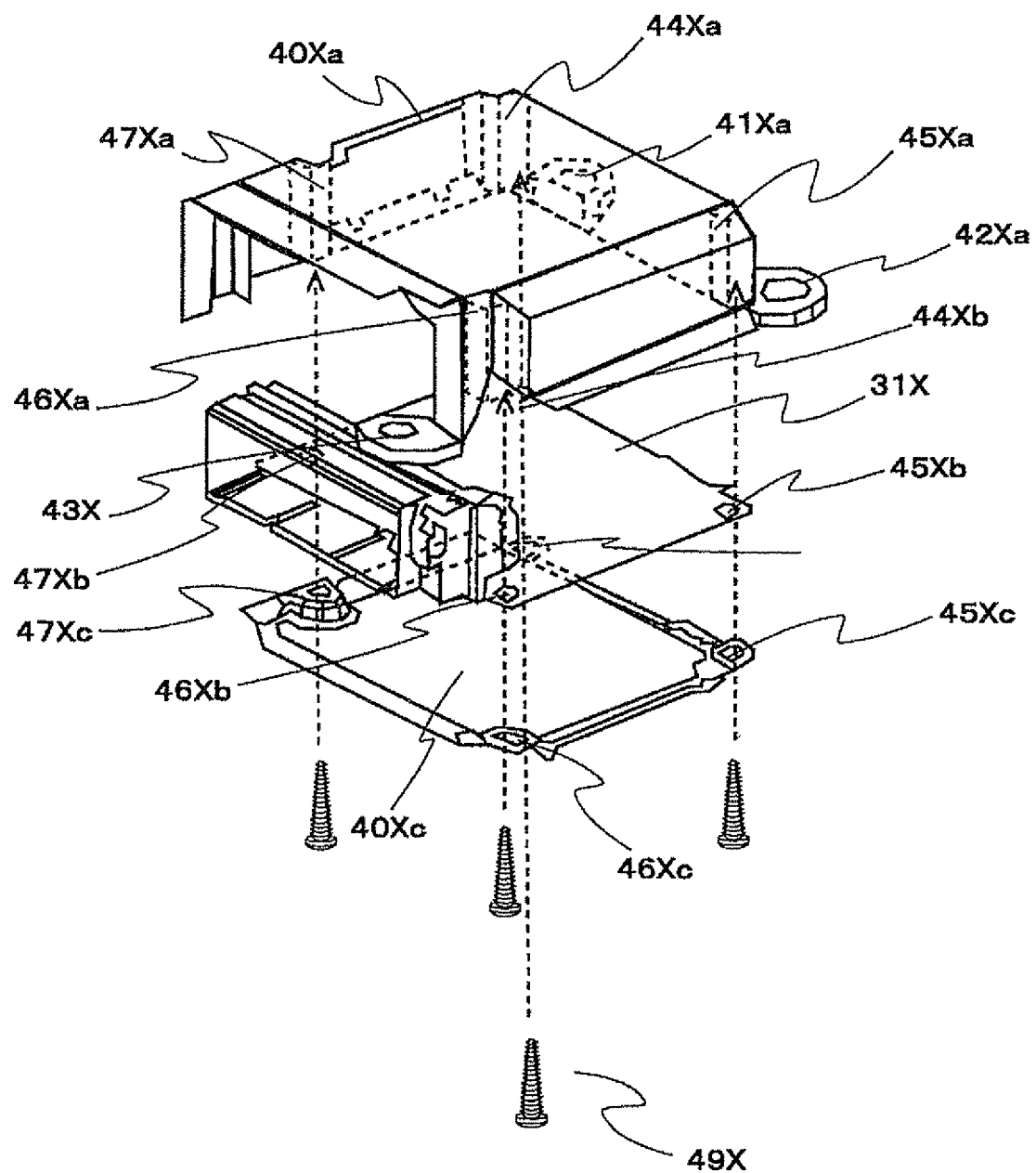
FIG. 8 is a diagram showing an electronic control device.

The appearance of an airbag electronic control device 30 of this embodiment on which an angular velocity sensor is mounted is the same as that of the electronic control device shown in FIG. 4. Thus, the airbag electronic control device 30 of this embodiment will be described with reference to FIG. 4. In the following description, the directions are appropriately represented by using the XYZ orthogonal coordinate axes shown in the drawing.

Figure 10:
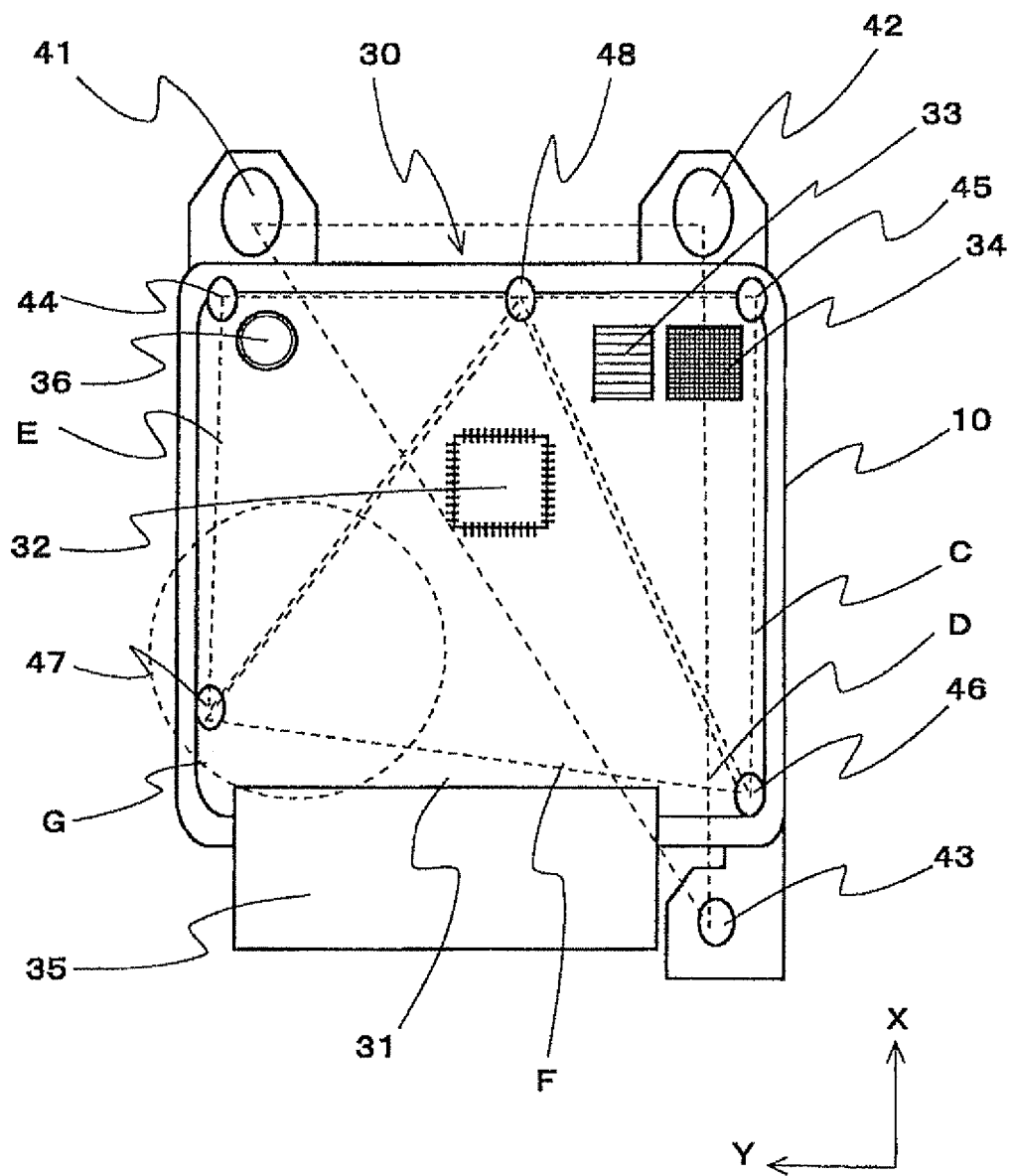
FIG. 10 is a diagram showing an electronic control device.
Figure 11:
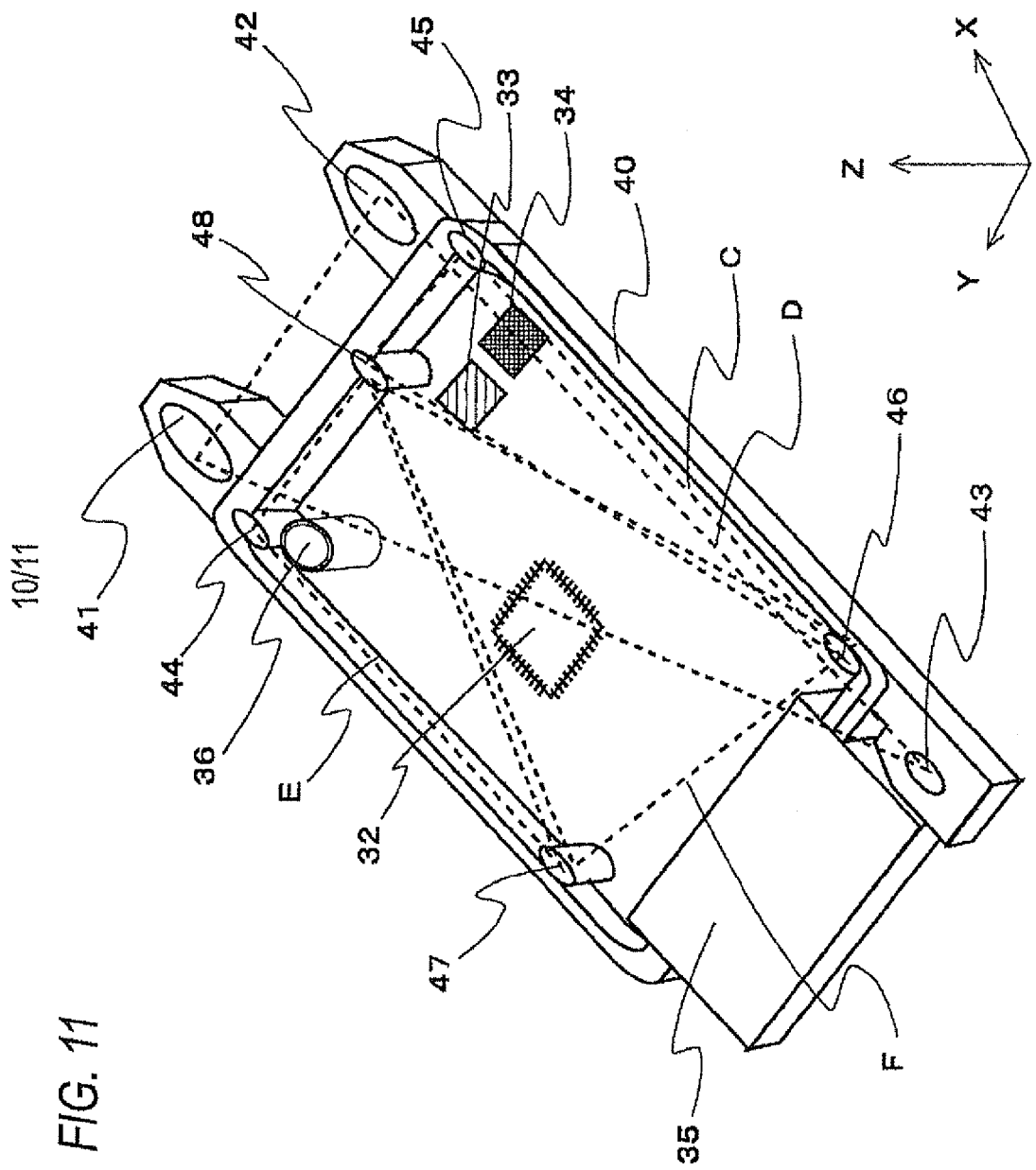
FIG. 11 is a diagram showing an electronic control device.

FIG. 10 is a perspective view showing a cross-section at the position P along the XY plane in the airbag electronic control device 30 of FIG. 4. FIG. 11 is a plan view showing the cross-section at the position P along the XY plane in the airbag electronic control device 30 of FIG. 4.

(Housing)

A housing 40 is configured such that a substantially rectangular opposing surface is fixed to be opposite to the vehicle body. The housing 40 has fixing portions, which are fixed to the body of the vehicle by screws, near three corners selected from four corners of the opposing surface. Specifically, as shown in FIGS. 10 and 11, the housing 40 has fixing portions 41, 42, and 43 which are fixed to the body of the vehicle by screws. A pitch between the fixing portions 41 and 42 near both ends of the +Y side of the opposing surface is smaller than a pitch between the fixing portions 42 and 43 near both ends of the −Y side of the opposing surface. The size of each of the fixing portions 41 and 42 on the +X side of the housing 40 is greater than the size of the fixing portion 43 on the −X side of the housing 40. The fixing portion 43 has a curve at a connection portion to the housing 40.

That is, the degree of fixing of the housing 40 to the vehicle body is stronger at the fixing portion 41 and the fixing portion 42 (+X side) than at the fixing portion 43 side (−X side). In other words, the degree of fixing of the housing 40 to the vehicle is weaker at the fixing portion 43 (−X side) than at the fixing portion 41 and the fixing portion 42 (+X side).

With this configuration, the fixing portion 43 is easily broken due to an impact when the vehicle collides against an external object, such that the airbag electronic control device 30 itself is hardly broken. Therefore, it is possible to prevent a problem in that the airbag electronic control device 30 is broken and cannot cause the airbag to inflate.

The reason why such configuration is required is that, as described above, although the airbag electronic control device 30 is mounted near the center of the vehicle where the airbag electronic control device 30 is hardly broken when the vehicle collides against an external object, an impact may have an effect near the center of the vehicle, and in this case, a countermeasure is required.

(Combination of Electronic Substrate and Housing)

Figure 1:
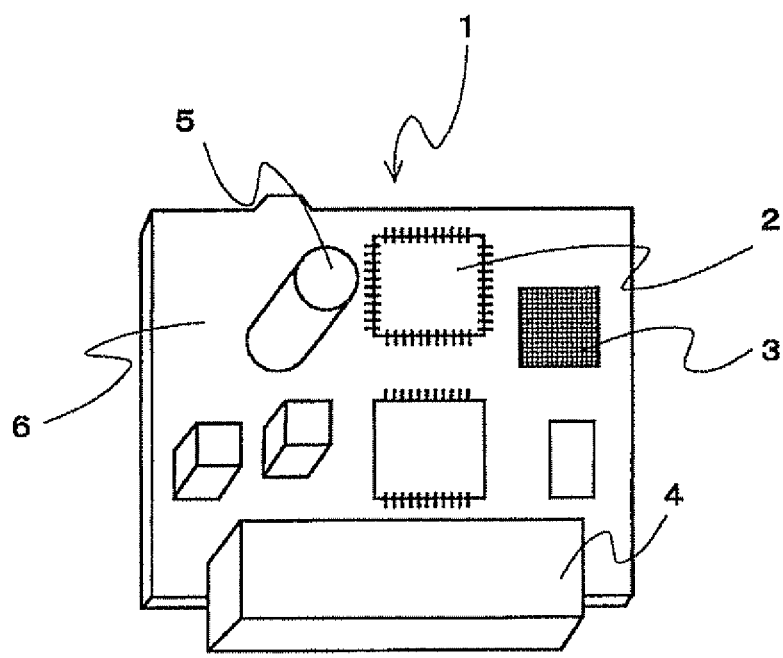
FIG. 1 is a diagram showing an airbag electronic control device.
Figure 2:
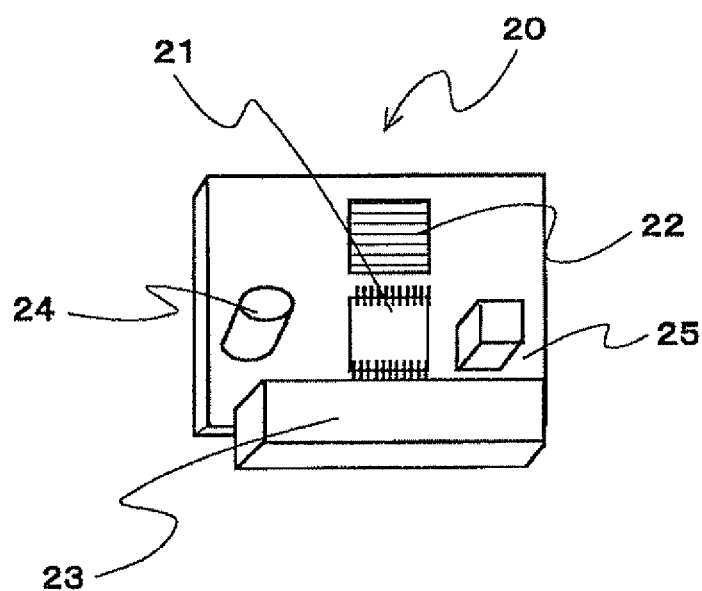
FIG. 2 is a diagram showing a VSC electronic control device.
Figure 3:
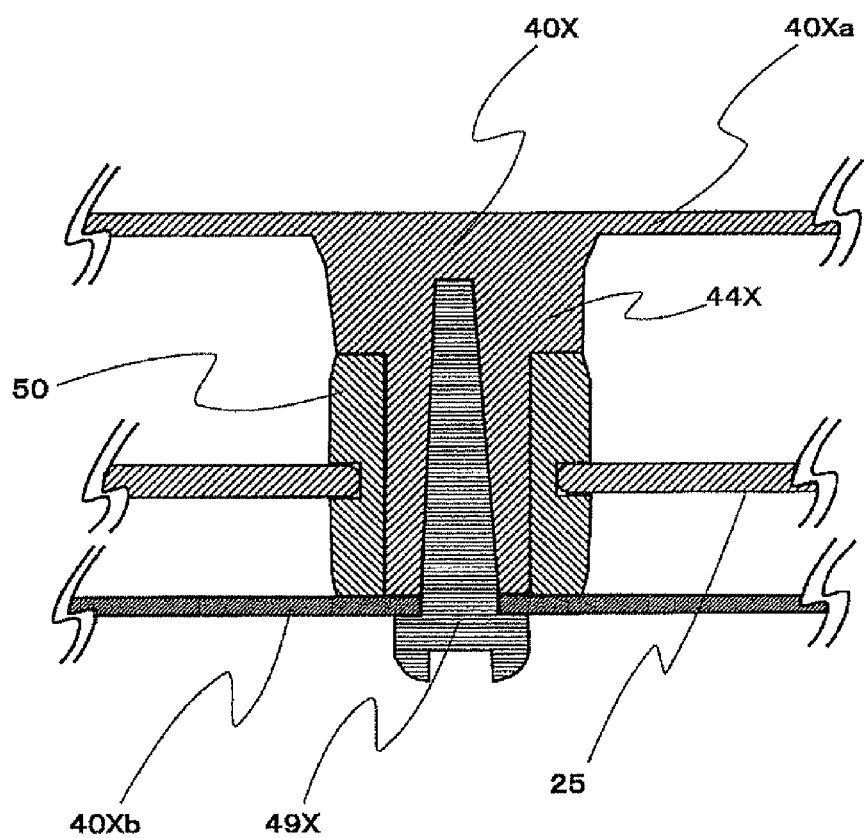
FIG. 3 is a diagram showing fixing of an electronic substrate and a housing of a VSC electronic control device.
Figure 12:
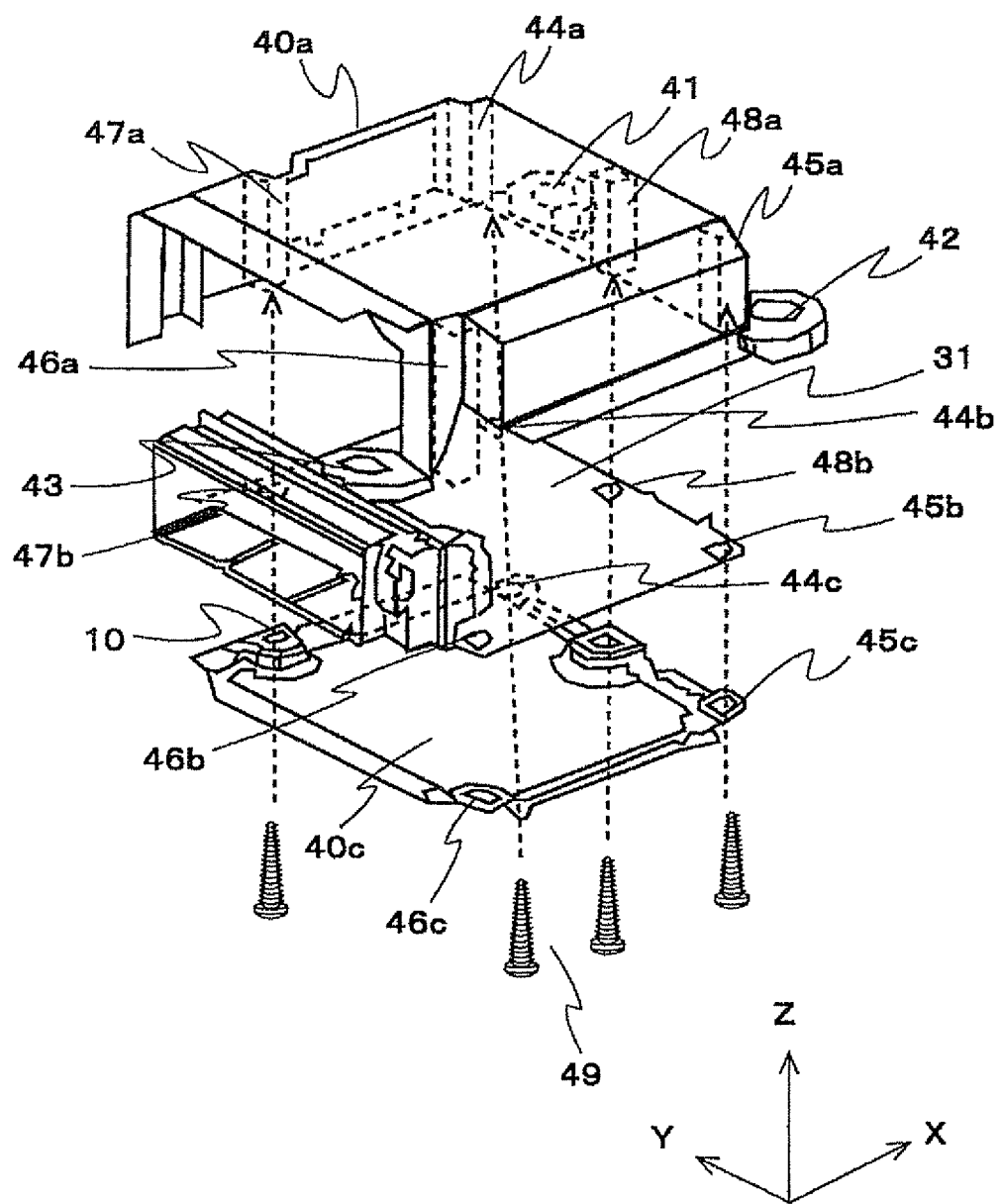
FIG. 12 is a diagram showing an electronic control device.

A method of combining and fixing the housing 40 and the electronic substrate 31 is as shown in FIG. 12. That is, an upper housing part 40a and a lower hosing part 40c are combined with each other so as to accommodate the electronic substrate 31, such that fixing points 44b, 45b, 46b, 47b, and 48b of the electronic substrate 31, fixing points 44a, 45a, 46a, 47a, and 48a of the upper housing part 40a, and fixing points 44c, 45c, 46c, 47c, and 48c of the lower hosing part 40c are fixed by five screws 49. Although the electronic substrate 25 is indirectly fixed to the housing 40X through the buffer material 50 in the related-art airbag electronic control device 1, as shown in FIG. 3, the electronic substrate 31 is directly fixed to the housing 40 without the buffer material 50 therebetween. Thus, it is possible to rigidly fix the electronic substrate 31 to the housing 40.

The electronic substrate 31 shown in FIGS. 10 and 11 has a substantially rectangular substrate surface. The electronic substrate 31 has fixing points 44, 45, 46, and 47 near four corners of the substrate surface, and a fixing point 48 slightly out of the center of one side of the substrate surface. That is, the fixing point 48 is provided to be out of the center of one side of the substrate surface connecting the two corners of the fixing points 44 and 45 of the electronic substrate 31 and lean to the fixing point 45 (−Y side). This configuration implements five-point fixing.

When the electronic substrate 31 is combined with and fixed to the housing 40, the fixing point 48 is located near one side of the opposing surface of the housing 40 where the pitch between the fixing portions is small (one side of the opposing surface connecting the fixing portion 41 and the fixing portion 42 on the +X side). In other words, the electronic substrate 31 has an angular velocity sensor 33 and an acceleration sensor 34 which are mounted near the fixing point 45 at one corner from among the fixing points 44, 45, 46, and 47 at four corners in the electronic substrate 31, as described above, and has the fixing point 48 which is close to the fixing point 45 so as to pinch the angular velocity sensor 33 and the acceleration sensor 34.

Therefore, five-point fixing, instead of four-point fixing, is implemented, such that the degree of fixing of the electronic substrate 31 and the housing 40 can be further tightened. The fifth fixing point 48 is provided at a position such that the resonance of an area where the angular velocity sensor 33 and the acceleration sensor 34 are mounted in the electronic substrate 31 is smaller than the resonance of other areas. For this reason, there is no case where the above-described erroneous control is performed. Instead of unreasonably increasing the fixing points to implement six-point fixing, seven-point fixing, eight-point fixing, . . . , other than four-point fixing, five-point fixing is implemented by adding only one point, such that a useless increase in cost is suppressed, and quality management is not complicated.

(Electronic Substrate)

The airbag electronic control device 30 includes the electronic substrate 31 on which the electronic components, such as the angular velocity sensor, are mounted, and the housing 40 which accommodates the electronic substrate 31 and is fixed to the body of the vehicle. As shown in FIG. 10, the electronic substrate 31 has a substantially rectangular shape. Mounted on the electronic substrate 31 are electronic components, such as an arithmetic section 32 (for example, CPU), the angular velocity sensor 33 (for example, yaw rate G sensor) which detects the angular velocity of the vehicle, the acceleration sensor 34 (for example, G sensor), a nonvolatile storage section (for example, ROM) which stores a program which is executed when the arithmetic section 32 controls a control target, such as the engine or the brake, a volatile storage section (for example, RAM) which serves as a working area at the time of an arithmetic operation by the arithmetic section 32, a connector 35 which is used for signal input/output with respect to an external device, and a capacitor 36 which is capable of supplying accumulated charges to the electronic components mounted on the electronic substrate 31.

Although the electronic substrate 31 has a substantially rectangular shape, an accurate oblong shape or square shape is not required. The substantially rectangular shape includes an oblong shape or a square shape with a cutout or a projection.

When the vehicle collides and is wrecked, the capacitor 36 mounted on the electronic substrate 31 is provided such that the function to initiate the squib at the time of collision and to cause the airbag to inflate can be exhibited even if power from a battery serving as a power supply is not supplied to the airbag electronic control device 30. Thus, the capacitor 36 having large capacity is required, and the size of the capacitor 36 also increases.

The mounting positions of the angular velocity sensor 33 and the acceleration sensor 34 on the electronic substrate 31 are in the smallest target area from among a plurality of areas having multiple points selected from a plurality of fixing points in the electronic substrate 31 as vertexes. The small area means that the area is further tightly fixed and the resonance frequency of the area is high. Therefore, it is certain that the mounting positions of the angular velocity sensor 33 and the acceleration sensor 34 are in the target area having the highest resonance frequency from among a plurality of areas having multiple points selected from a plurality of fixing points in the electronic substrate 31 as vertexes.

Detailed description will be provided with reference to FIGS. 10 and 11. As described above, the electronic substrate 31 of the airbag electronic control device 30 shown in FIGS. 10 and 11 has the fixing points 44, 45, 46, and 47 near the four corners and the fixing point 48 slightly out of the center of one side of the substrate surface of the electronic substrate 31. That is, the fixing point 48 is provided to be out of the center of one side of the substrate surface connecting two corners of the fixing points 44 and 45 of the electronic substrate 31 and lean to the fixing point 45. A plurality of areas having multiple points selected from the fixing point as vertexes include an area C which is a triangular area defined by the fixing points 45, 46, and 48, an area E which is a triangular area defined by the fixing points 44, 48, and 47, and an area F which is a triangular area defined by the fixing points 46, 47, and 48. The area C which is the smallest area from among the areas C, E, and F becomes an area where vibration or amplitude caused by an impact from the outside is smaller than other areas. An area D which is a triangular area defined by the fixing portions 41, 42, and 43 of the housing 40 is an area which is tightly fixed to the body of the vehicle. The reason why the area D is configured as above is that, three fixing points are provided in the housing 40 and the pitches between the fixing points are designed as described above, such that, as described above, the fixing portion 43 is easily broken due to an impact when the vehicle collides against an external object, and the airbag electronic control device 30 itself is hardly broken.

The angular velocity sensor 33 and the acceleration sensor 34 are mounted in the area C. The vibration and amplitude in the target area C can be reduced, and the frequency of resonance generated in the target area C can be increased. Therefore, it is possible to prevent the frequency band of a signal for use in each sensor and the resonance frequency from overlapping each other, and to prevent each sensor from outputting an erroneous signal. As described above, the housing 40 is tightly fixed to the body of the vehicle in the area D. Thus, vibration or amplitude due to an impact from the outside is smallest in an area where the area C and the area D overlap each other, compared to the other areas. Preferably, the angular velocity sensor 33 and the acceleration sensor 34 are mounted in this overlapped area.

In this embodiment, the angular velocity sensor 33 and the acceleration sensor 34 are mounted on the electronic substrate 31 such that a mounting position of the angular velocity sensor 33 is further tightly fixed compared to a mounting position of the acceleration sensor 34. In other words, the resonance frequency at the mounting position of the angular velocity sensor 33 is higher than the resonance frequency at the mounting position of the acceleration sensor 34. As shown in FIG. 10, although the angular velocity sensor 33 is entirely located in the overlapped area, the acceleration sensor 34 is partially located in the overlapped area and a part of the acceleration sensor 34 is located outside of the overlapped area.

Generally, the acceleration sensor for the airbag is tightly fixed to increase the resonance frequency at a mounting position of the acceleration sensor and the angular velocity sensor which detects the rotation of the vehicle is fixed with a buffer material to decrease the resonance frequency at a mounting position of the angular velocity sensor. This is to prevent the resonance from occurring in the useful frequency band of those sensors (the frequency band in which the sensors operate).

However, when the acceleration sensor and the angular velocity sensor are mounted on the same substrate, it is difficult to achieve a balance between two fixing methods for those two sensors. Thus, the embodiment employs one fixing method in which both the acceleration sensor 34 and the angular velocity sensor 33 are tightly fixed to the electronic substrate 31. Therefore, in the embodiment, the mounting position of the angular velocity sensor 33 of which the useful frequency band is relatively high is given priority to the mounting position of the acceleration sensor 34 so that the resonance frequency at the mounting position of the angular velocity sensor 33 can be separated from the useful frequency band of the angular velocity sensor 33 as far as possible.

Figure 9:
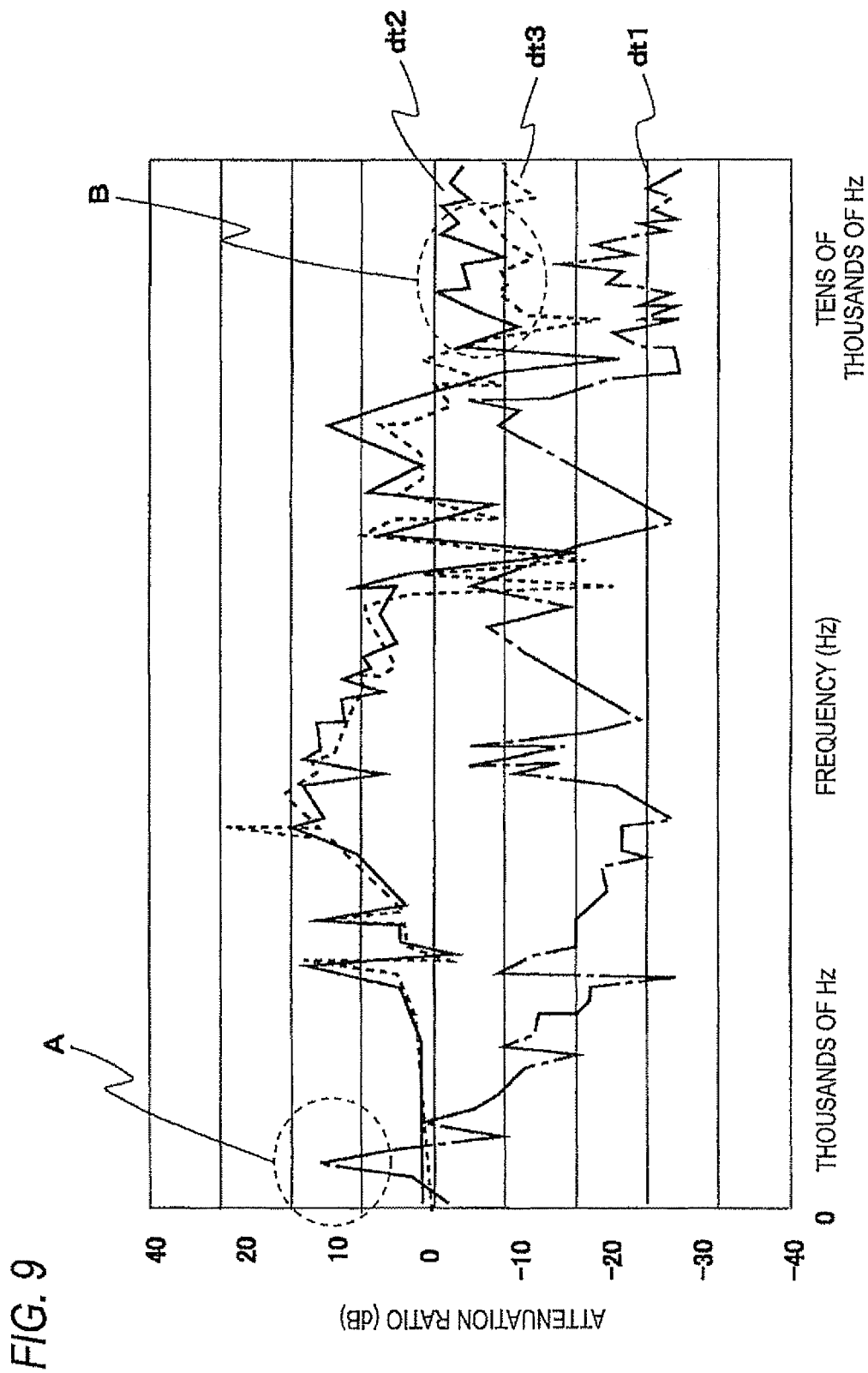
FIG. 9 is a diagram showing the resonance level of each frequency band in an electronic control device.

The effects of such configuration will be described with reference to FIG. 9. In FIG. 9, the horizontal axis represents the vibration frequency which is given to the airbag electronic control device 30 of this embodiment, and the vertical axis represents the level (attenuation ratio (dB)) when the airbag electronic control device 30 of this embodiment resonates with the given vibration frequency. In the area C of the airbag electronic control device 30 of this embodiment, data representing the resonance level in each frequency band is data dt3 indicated by a broken line.

Referring to FIG. 9, data dt3 which is data of the airbag electronic control device 30 of this embodiment indicates that the resonance level is small when the vibration frequency equal to or lower than thousands of Hz and the resonance level is also small with the vibration frequency of tens of thousands of Hz. When this happens, there is no case where the resonance frequency of the airbag electronic control device 30 of this embodiment, the frequency band (equal to or lower than thousands of Hz) for use in the acceleration sensor 34, and the frequency band (tens of thousands of Hz) for use in the angular velocity sensor 33 overlap each other, thus there is almost no case where airbag control is erroneously performed and the VSC function is used to perform vehicle control. That is, it is certain that, in order to exhibit the VSC function by the angular velocity sensor without causing erroneous control and to exhibit the airbag control function by the acceleration sensor without causing erroneous control, the airbag electronic control device of this embodiment in which five-point fixing is implemented is appropriately used.

(Capacitor)

As described above, the capacitor 36 having considerable capacity and size is mounted on the electronic substrate 31 of the airbag electronic control device 30. The capacitor 36 has a cylindrical shape having a predetermined height (for example, 3 cm) and a predetermined radius (for example, 1.0 cm), and the lower part of the capacitor 36 is mounted on and fixed to the electronic substrate 31. For this reason, if resonance is generated in the airbag electronic control device 30, the upper part of the capacitor is greatly bent, and resonance near the mounting position of the capacitor 36 in the electronic substrate 31 further increases. This resonance may affect the angular velocity sensor 33 or the acceleration sensor 34, such that erroneous error may be performed. Thus, as shown in FIGS. 10 and 11, in the electronic substrate 31, the capacitor 36 is mounted away from the angular velocity sensor 33 and the acceleration sensor 34. That is, in the electronic substrate 31, the capacitor 36 is mounted near one corner of the substrate surface outside the target area C where the angular velocity sensor 33 and the acceleration sensor 34 are arranged. Specifically, the capacitor 36 is mounted near the fixing point 44 at the +X-side and +Y-side corner of the substrate surface in the electronic substrate 31.

Therefore, vibration generated by the capacitor 36 which is bent in accordance with vibration generated in the airbag electronic control device 30 does not affect the angular velocity sensor 33 and the acceleration sensor 34, and there is no concern that the above-described erroneous control is performed.

(Connector)

As described above, the connector 35 is mounted on the electronic substrate 31 of the airbag electronic control device 30. The connector 35 is an interface which has a function for signal input/output with respect to an external device and in which a signal output outside the airbag electronic control device 30 and a signal input to the airbag electronic control device 30 are collected. Therefore, if noise is generated in the connector 35, noise is superimposed on many signals, thus noise should not be generated.

The capacitor 36 may generate noise when supplying the accumulated charges to the electronic components mounted on the electronic substrate 31, thus the connector 35 should not be mounted near the capacitor 36. For this reason, as shown in FIGS. 10 and 11, the connector 35 is mounted along a side including an opposing corner opposite the corner of the substrate surface, at which the capacitor 36 is mounted, in the electronic substrate 31. Specifically, the connector 35 is mounted along a side (−X side) whose one end is an opposing corner (−X-side and −Y-side corner) opposite the corner (+X-side and +Y-side corner) of the substrate surface near the capacitor 36 mounted near the capacitor fixing point 44.

Therefore, no noise occurs in the connector 35, and there is no case where noise is superimposed on the signals input/output to/from the airbag electronic control device 30.

Although the embodiment of the invention has been described, the invention is not limited to the foregoing embodiment, and various modifications may be made.

What is claimed is:

1. An electronic control device which is mounted in a vehicle and controls a control target provided in the vehicle, the electronic control device comprising:
   an acceleration sensor that detects an acceleration of the vehicle;
   an angular velocity sensor that detects an angular velocity of the vehicle;
   an electronic substrate on which the acceleration sensor and the angular velocity sensor are mounted; and
   a housing that accommodates the electronic substrate and is fixed to a body of the vehicle,
   wherein the electronic substrate is fixed to the housing at at least four fixing points, and the acceleration sensor and the angular velocity sensor are arranged in the smallest target area from among a plurality of areas having multiple points selected from the at least four fixing points as vertexes.

2. The electronic control device as set forth in claim 1,
   wherein the electronic substrate has a substantially rectangular substrate surface,
   wherein the at least four fixing points are respectively arranged in the vicinity of four corners of the substrate surface and in the vicinity of a position out of a center of one side of the substrate surface, and
   wherein the smallest area from among a plurality of triangular areas having three points selected from the at least four fixing points as vertexes is set as the target area.

3. The electronic control device as set forth in claim 2,
   wherein the housing has fixing portions which are fixed to the body of the vehicle and arranged in the vicinity of three corners selected from four corners of a substantially rectangular opposing surface which is opposed to the body of the vehicle, and
   wherein a pitch between the fixing portions in the vicinity of both ends of one side of the opposing surface is smaller than a pitch between the fixing portions in the vicinity of both ends of another side of the opposing surface.

4. The electronic control device as set forth in claim 3, wherein the fixing portion provided at the position out of the center of one side of the substrate surface is arranged in the vicinity of the one side of the opposing surface in the housing where the pitch between the fixing portions is small.

5. The electronic control device as set forth in claim 2, further comprising a capacitor mounted on the electronic substrate,
   wherein the capacitor is arranged in the vicinity of one corner of the substrate surface other than the target area in the electronic substrate.

6. The electronic control device as set forth in claim 5, further comprising a connector that communicates a signal with an external device,
   wherein the connector is arranged along a side whose one end is an opposing corner of the substrate surface, at which the capacitor is arranged, in the electronic substrate.

7. The electronic control device as set forth in claim 1, wherein the electronic substrate is directly fixed to the housing.

8. The electronic control device as set forth in claim 1, wherein the angular velocity sensor and the acceleration sensor are arranged in the target area such that a resonance frequency at a mounting position of the angular velocity sensor is higher than the resonance frequency at a mounting position of the angular velocity sensor.

9. The electronic control device as set forth in claim 1,
   wherein the housing has fixing portions which are fixed to the body of the vehicle, and
   wherein the angular velocity sensor is arranged in an overlapped area where the target area and an area defined by the fixing portions overlap each other.

10. An electronic control device which is mounted in a vehicle and controls a control target provided in the vehicle, the electronic control device comprising:
    an acceleration sensor that detects an acceleration of the vehicle;
    an angular velocity sensor that detects an angular velocity of the vehicle;
    an electronic substrate on which the acceleration sensor and the angular velocity sensor are mounted; and
    a housing that accommodates the electronic substrate and is fixed to a body of the vehicle,
    wherein the electronic substrate is fixed to the housing at a plurality of fixing points, and the plurality of fixing points include first fixing points which are respectively arranged in the vicinity of four corners of a substantially rectangular substrate surface of the electronic substrate and a second fixing point which is arranged closer to one of the four first fixing points than the other first fixing points with the acceleration sensor and the angular velocity sensor between the second fixing point and the one of the four first fixing points.

11. An electronic control device which is mounted in a vehicle and controls a control target provided in the vehicle, the electronic control device comprising:
    an acceleration sensor that detects an acceleration of the vehicle;
    an angular velocity sensor that detects an angular velocity of the vehicle;
    an electronic substrate on which the acceleration sensor and the angular velocity sensor are mounted; and
    a housing that accommodates the electronic substrate and is fixed to a body of the vehicle,
    wherein the electronic substrate is fixed to the housing at at least four fixing points, and the acceleration sensor and the angular velocity sensor are arranged in a target area having the highest resonance frequency from among a plurality of areas having multiple points selected from the at least four fixing points as vertexes.

* * * * *